(12) United States Patent
Brothers (10) Patent No.: US 7,911,480 B2
(45) Date of Patent: Mar. 22, 2011

(54) COMPRESSION OF MULTIPLE-SAMPLE-ANTI-ALIASING TILE DATA IN A GRAPHICS PIPELINE

(75) Inventor: John Brothers, Calistoga, CA (US)

(73) Assignee: Via Technologies, Inc., Hsin Tien, Taipei (TW)

( * ) Notice: Subject to any disclaimer, the term of this patent is extended or adjusted under 35 U.S.C. 154(b) by 834 days.

(21) Appl. No.: 11/868,661

(22) Filed: Oct. 8, 2007

(65) Prior Publication Data

US 2009/0091577 A1 Apr. 9, 2009

(51) Int. Cl.
*G09G 5/00* (2006.01)
*G06T 1/20* (2006.01)

(52) U.S. Cl. .......................... 345/611; 345/506

(58) Field of Classification Search .............. 345/501, 345/506, 558, 611
See application file for complete search history.

(56) References Cited

U.S. PATENT DOCUMENTS

| 6,825,847 | B1 * | 11/2004 | Molnar et al. ............... 345/555 |
| 6,961,057 | B1 * | 11/2005 | Van Dyke et al. ............ 345/422 |
| 2004/0161146 | A1 * | 8/2004 | Van Hook et al. ............ 382/166 |
| 2005/0093873 | A1 * | 5/2005 | Paltashev et al. ............ 345/581 |
| 2006/0170703 | A1 * | 8/2006 | Liao ............................. 345/613 |

\* cited by examiner

*Primary Examiner* — Kee M Tung
*Assistant Examiner* — Jacinta Crawford
(74) *Attorney, Agent, or Firm* — Thomas, Kayden, Horstemeyer & Risley, LLP (57) ABSTRACT

Provided is a system for compressing multiple-sample-anti-aliasing (MSAA) tile data in a computer graphics pipeline. The system includes a plurality of pixels configured as a tile, where the tile has a plurality of samples of descriptor data for the pixels. Multiple graphics data processing units configured to receive the plurality of samples contain a plurality of coverage masks, which correspond to covered subtiles and compression logic encodes the tile descriptor data for receipt by a buffer.

20 Claims, 11 Drawing Sheets

COMPRESSION OF MULTIPLE-SAMPLE-ANTI-ALIASING TILE DATA IN A GRAPHICS PIPELINE

TECHNICAL FIELD

The present disclosure is generally related to computer graphics and, more particularly, is related to a compressing tile data in a graphics pipeline.

BACKGROUND

The art and science of three-dimensional ("3-D") computer graphics concerns the generation and/or rendering of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices. For example, a coordinate (X, Y, Z) that defines a point, can represent the endpoint of a line segment or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per-vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates) and some specification of material surface properties (e.g., color, texture, shininess, etc.), as well as possibly the normal vectors to the surface at each vertex. For three-dimensional objects with complex curved surfaces, the polygons may include triangles and/or quadrilaterals, and the latter can be decomposed into pairs of triangles.

A transformation engine transforms the object coordinates in response to the angle of viewing selected by a user from user input. In addition, the user may specify the field of view, the size of the image to be produced, and the back end of the viewing volume so as to include or eliminate background as desired.

Once this viewing area has been selected, clipping logic eliminates the polygons (e.g., triangles), which are outside the viewing area, and "clips" the polygons, which are partly inside and partly outside the viewing area. These clipped polygons may correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their attribute values are then transmitted to a rasterizer.

For one or more of the polygons, the rasterizer determines which pixel positions are covered by the polygon and attempts to write the associated attribute values and depth (Z value) into a frame buffer. The rasterizer compares the depth values (Z) for the polygon being processed with the depth value of a pixel, which may already be written into the frame buffer. If the depth value of the new polygon pixel is smaller, indicating that it is in front of the polygon already written into the frame buffer, then its value may replace the value in the frame buffer because the new polygon will obscure the polygon previously processed and written into the frame buffer. This process is repeated until all of the polygons have been rasterized. At that point, the video controller displays the contents of a frame buffer on a display one scan line at a time in raster order.

The default methods of performing real-time rendering may display polygons as pixels located either inside or outside the actual edges of the polygon. The resulting edges, which define the polygon, can appear with a jagged look in a static display and a crawling look in an animated display. The underlying problem producing this effect is called aliasing and the methods applied to reduce or eliminate the problem are called anti-aliasing techniques.

One anti-aliasing technique adjusts pixel attributes where aliasing occurs in an attempt to smooth the display. For example, a pixel's intensity may depend on the length of the line segment that falls in the pixel's area. Screen-based anti-aliasing methods do not require knowledge of the objects being rendered because they use only the pipeline output samples. Another anti-aliasing method utilizes a line anti-aliasing technique called Multiple-Sample-Anti-Aliasing (MSAA), which takes more than one sample per pixel in a single pass. The number of samples or sub-pixels taken for each pixel is called the sampling rate and, axiomatically, as the sampling rate increases, the tile data amount and associated memory traffic increases. It must be noted that in practice the number of samples may vary. Although a higher sampling rate can produce better anti-aliasing, the demand on system resources increases in proportion to the sampling rate.

Three-dimensional data processing may be data intensive. Compression schemes for multisample data may be utilized to reduce the amount of data transferred between the graphics pipeline stages, as well as memory and the processor to improve performance. Thus, a heretofore-unaddressed need exists in the industry to address the aforementioned deficiencies and inadequacies.

SUMMARY

An embodiment of the present disclosure provides a graphics processing system for compressing multiple-sample-anti-aliasing (MSAA) tile data having a different sampling rate in a computer graphics pipeline. The system comprises: a plurality of pixels configured as a tile; tile descriptor data comprising a description of a plurality of samples corresponding to each of the plurality of pixels; a plurality of graphics data processing units configured to receive the plurality of samples; and compression logic configured to encode the tile descriptor data.

An embodiment of the present disclosure can also be viewed as providing a method for compressing tile data in a multiple-sample anti-aliasing computer graphics pipeline. In this regard, one embodiment of such a method, among others, can be broadly summarized by the following steps: receiving tile descriptor data, corresponding to a tile, into a Z-unit; packing the tile descriptor data into an output tile entry for subsequent processing by a plurality of pipeline processing units; determining which of a plurality of coverage masks, corresponding to the descriptor data in the output tile entry, correspond to covered subtiles; encoding the tile descriptor data; and writing encoded data into a FIFO buffer.

An alternative embodiment of the present disclosure can also be viewed as providing a method of compressing multiple-sample-anti-aliasing (MSAA) descriptor data for a tile in a computer graphics pipeline. One embodiment of such a method, among others, can be broadly summarized by the following steps: means for providing tile descriptor data to the computer graphics pipeline; means for determining which of a plurality of coverage masks correspond to covered subtiles; means for generating a subtile pixel coverage mask, configured to correspond to each of the plurality of pixels in the tile; means for determining an encoded data file format; means for encoding tile descriptor data; and means for providing encoded data to a plurality of processing units in the computer graphics pipeline.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 1:
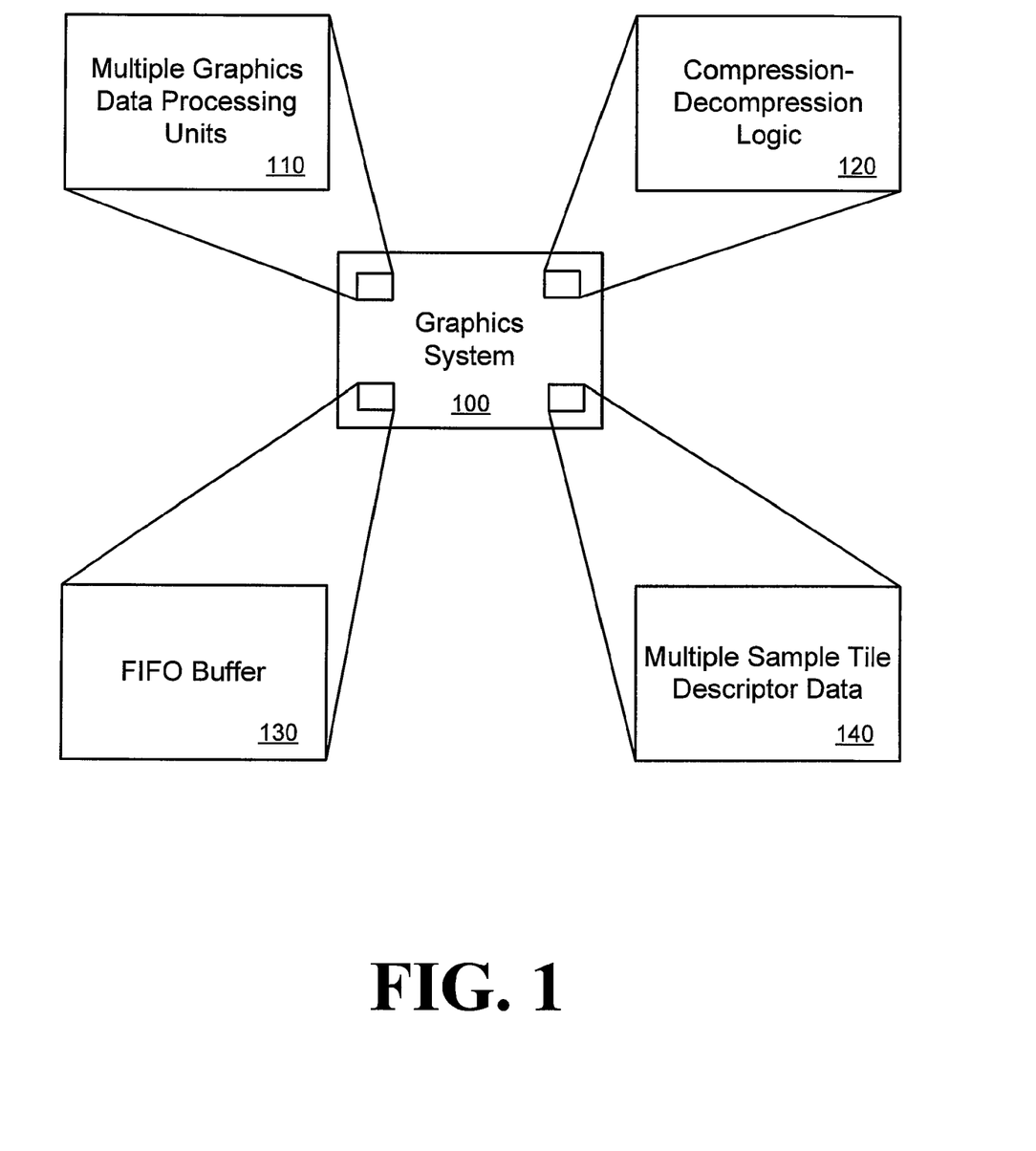
FIG. 1 is a block diagram illustrating an exemplary graphics system as disclosed herein.

Reference is briefly made to FIG. 1, which is a block diagram illustrating an exemplary graphics system as disclosed herein. The graphics system can include multiple graphics data processing units 110 configured to process data in a graphics pipeline. The graphics system 100 may also include compression-decompression logic 120 configured to compress-decompress the graphics data for more efficient operation and storage. One or more FIFO buffers 130 can be utilized to maintain data in a pipeline while compensating for latency within the individual graphic data processing units. The exemplary graphic system also utilizes multiple sample tile descriptor data 140 as a compression-decompression approach in compensating for the effects of aliasing, as discussed above.

The multiple graphics data processing units 110 can be numerous types of data processing units including, but not limited to, a triangle set up unit, a tile generator, a compressed Z data buffer, a pixel Z data buffer, multiple pixel packers, an interpolation unit, and a write back unit, among others. The compression-decompression logic 120 can be used to reduce the system requirements associated with attribute and tile data either within the pipeline or in a corresponding FIFO buffer 130. As discussed above, the multiple sample tile descriptor data 140 is utilized to reduce the effects of aliasing by providing multiple color attribute (e.g., color) samples for each pixel in a tile.

Figure 2:
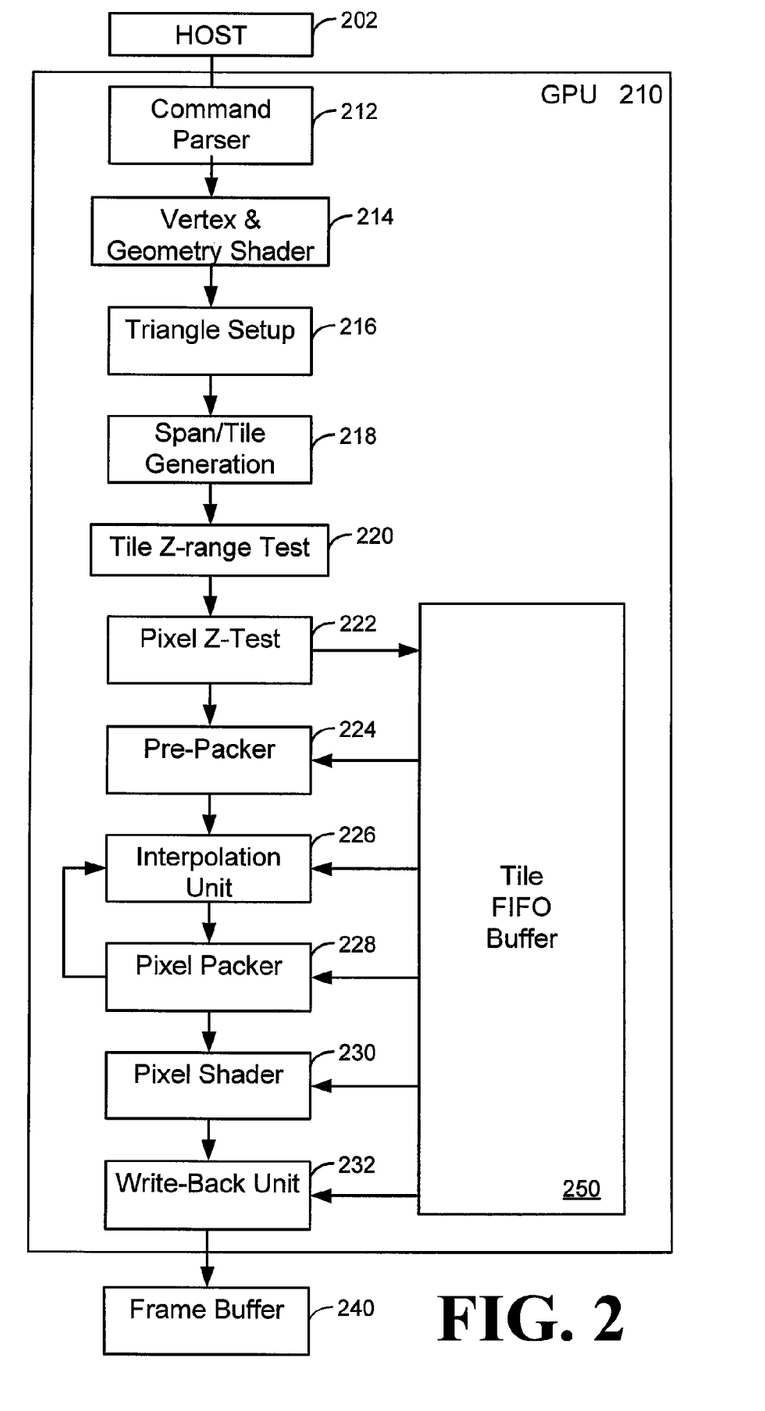
FIG. 2 is a block diagram illustrating an exemplary embodiment of a graphics pipeline as disclosed herein.

Reference is now made to FIG. 2, which illustrates certain components in one embodiment of a graphics pipeline implementing compression of multiple-sample-anti-aliasing tile descriptor data. More specifically, FIG. 2 illustrates an embodiment of the present disclosure in which a graphics pipeline, employing a plurality of components, embodies certain inventive features. For example, the command parser 212, vertex and geometry shader 214, triangle set up 216, and the span/tile generation 218 may be present within the GPU 210. Also included is a tile Z range test 220, in which a Z-test can be performed on compressed Z data. Compressed Z-tests performed in this way may improve efficiency by trivially accepting or trivially rejecting certain primitives (or alternatively, ranges of pixels) based on compressed Z information. A similar per pixel test may be performed by the pixel Z-test block 222.

The graphics pipeline of FIG. 2 also illustrates data moving from a pixel Z-test 222 to a pre-packer 224, which determines how pixels will be packed together through the pixel shader (not shown) in the texture pipeline (not shown). After the pre-packer 224, the data moves logically to the interpolation unit 226 for texture coordinate generation. The tile data then moves to the pixel packer 228, which issues read requests as required in the pixel shader 230 write-back unit 232. Tile data again moves to the interpolation unit 226 when the texture data arrives, at which point the other pixel coordinates are computed. The tile data goes back to the pixel packer 228 to pack valid component data to feed into the pixel shader 230. The pixel packing operations can be performed by independent logical units or by a single unit including a single unit having multiple stages. As the name implies, the pixel shader 230 performs shading operations on a per pixel basis. The tile data moves logically to a pixel unpacker (not shown) to unpack packet data output by the pixel shader 230 into sub-tiles. The tile data moves to the write-back unit 232 and is ultimately stored within the frame buffer 240.

The GPU 210 also includes at least one FIFO buffer 250 for providing latency compensation for the data in the pipeline. The FIFO buffer also known as a tile FIFO buffer 250 and is a pointer FIFO configured to perform in conjunction with a separate data buffer. The pixel Z-test unit 222, also referred to as ZL2, writes data in at the top of the tile FIFO buffer 250 where the tile data moves logically from one module in the pipeline to the next. The graphics data processing units in the pipeline below the pixel Z-test unit 222, including, but not limited to, the pre-packer 224, interpolation unit 226, and the write-back unit 232, all have read pointers within the tile FIFO buffer 250. The tile FIFO buffer 250 needs to be large enough to compensate for texture read and filtering latency and pixel shader latency and should be sized to accommodate additional data associated with multiple-sample-anti-aliasing coverage masks.

Figure 3:
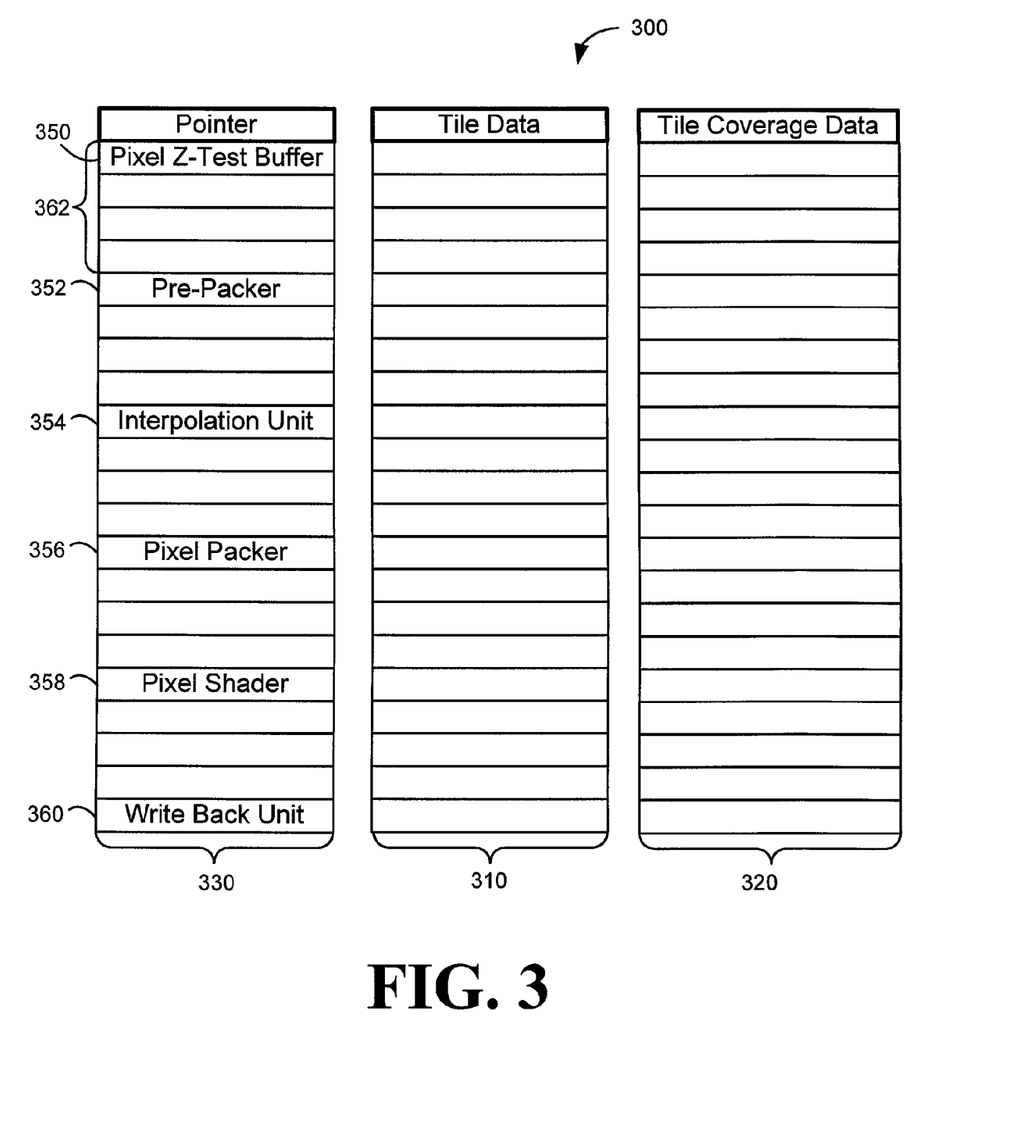
FIG. 3 is a block diagram illustrating an exemplary embodiment of a tile FIFO buffer as disclosed herein.

Reference is now made to FIG. 3, which is a block diagram illustrating an exemplary embodiment of a tile FIFO buffer as disclosed herein. The tile FIFO buffer 300 includes tile data 310, tile coverage data 320 and separate FIFO with read/write pointers 330. As discussed above, in reference to FIG. 2, the pixel Z-test unit writes to the tile FIFO buffer 300 as shown by the pixel Z-test pointer 350. The tile FIFO buffer is partitioned such that each of the graphics data processing units in the pipeline between the pixel Z-test unit and the write back unit can read the tile data as needed. For example, the pixel Z-test unit data is maintained at the first buffer section 362 and represents the data that has been written for the tile FIFO buffer by ZL2 but is not ready for processing by the pre-packer. Examples of read pointers in the tile FIFO buffer 300 include, but are not limited to, a pre-packer 352, interpolation unit 354, pixel packer 356, pixel shader 358 and write-back unit 360. The data is moved logically through the pipeline by using the pointers to the tile FIFO buffer entries. One should note that the tile FIFO buffer ends at the write-back unit 360.

Figure 4:
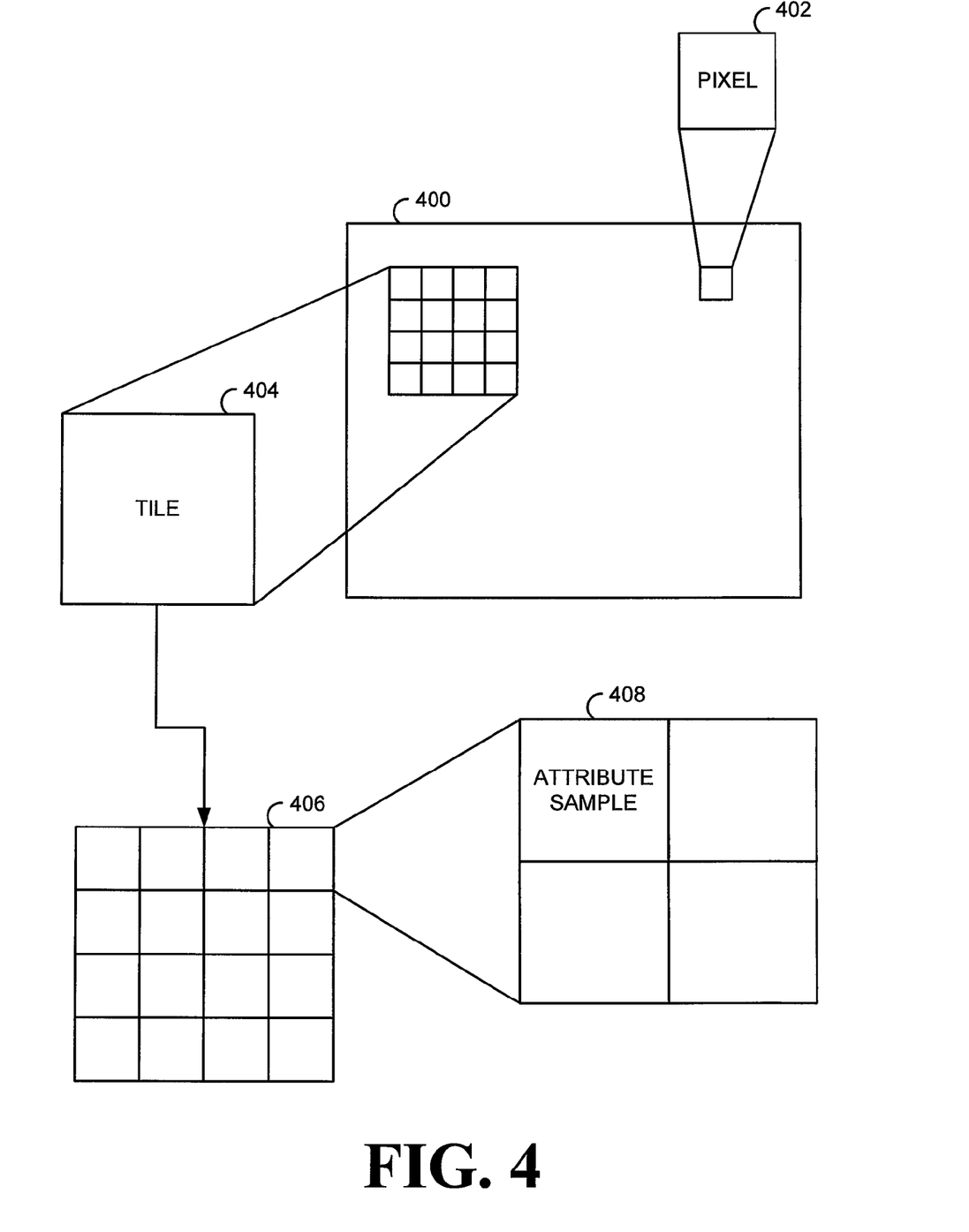
FIG. 4 is a block diagram illustrating an exemplary representation of a multiple-sample-anti-aliasing scheme.

Reference is made briefly to FIG. 4, which illustrates an exemplary graphical data organizational scheme of an embodiment of the present disclosure. Shown first, within the boundaries of a display 400, is one of many pixels 402. The pixels 402 are organized into dimensionally specific groups known as tiles 404. The tile of an exemplary embodiment contains sixteen total pixels in a four-by-four pixel configuration 406. One of ordinary skill in the art will understand that tiles of different dimensions are consistent with the spirit and scope of the systems and methods taught herein.

As discussed above, in a computer graphics system, there may be a significant amount of graphics data associated with each pixel 402. This graphics data may include attribute information, such as X, Y coordinates, red, green, blue, and alpha (R, G, B, A), depth information (Z), texture information (U and V coordinates), etc. Within the context of the MSAA methods, the attribute information alone may represent a significant amount of data, especially as sampling rates increase. For example, a computer graphics system utilizing MSAA methods at a sampling rate of four would store four different attribute samples for each pixel. Thus, the attribute sample data associated with the tile 406 will have four samples of attribute data 408 for each pixel. Each sample of attribute data 408 of this embodiment comprises, for example, 32-bits of attribute data. In some embodiments, each attribute sample may also be configured as a sub-pixel. In the case where one or more of the attribute samples for this tile may be read from the frame buffer, the total amount of attribute data is four samples per pixel for each of the sixteen pixels.

Figure 5:
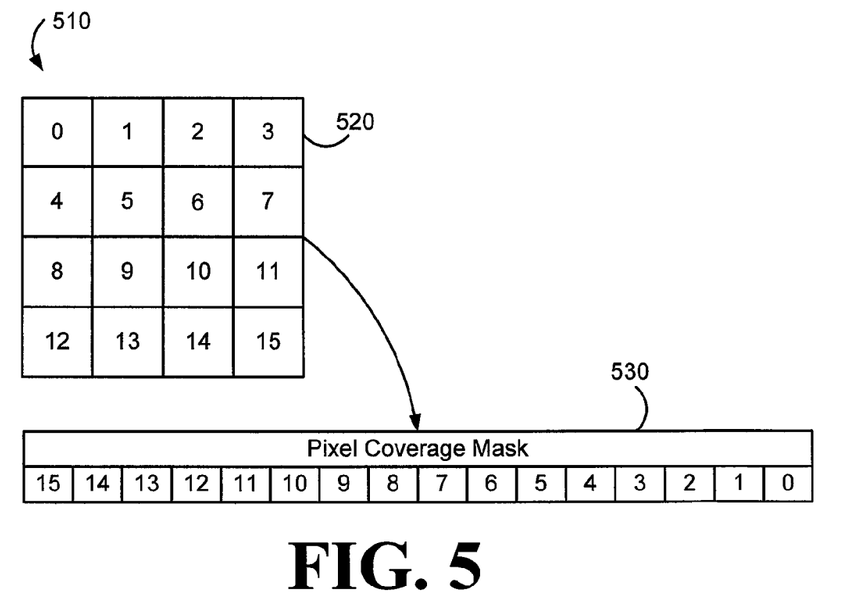
FIG. 5 is a block diagram illustrating an embodiment of a pixel mask as disclosed herein.

Reference is briefly made to FIG. 5, which is a block diagram illustrating an embodiment of a pixel coverage mask as disclosed herein. A pixel mask may be part of tile descriptor data. FIG. 5 depicts a tile 510 as a four-by-four array of pixels 520. One of ordinary skill in the art will understand that the four-by-four tile dimension is merely exemplary and that the tile 510 can be configured as having a variety of dimensional characteristics. For example, the tile 510 can be configured as a two-by-two array, a one-by-eight array, or an eight-by-eight array, among others. The pixel coverage mask 530 provides a single bit corresponding to each pixel 520 in the array 510. In this manner, the pixel coverage mask 530 can be utilized to determine whether the tile is partially or fully covered. For example, where a pixel coverage mask has all "ones," the tile is fully covered.

Figure 6:
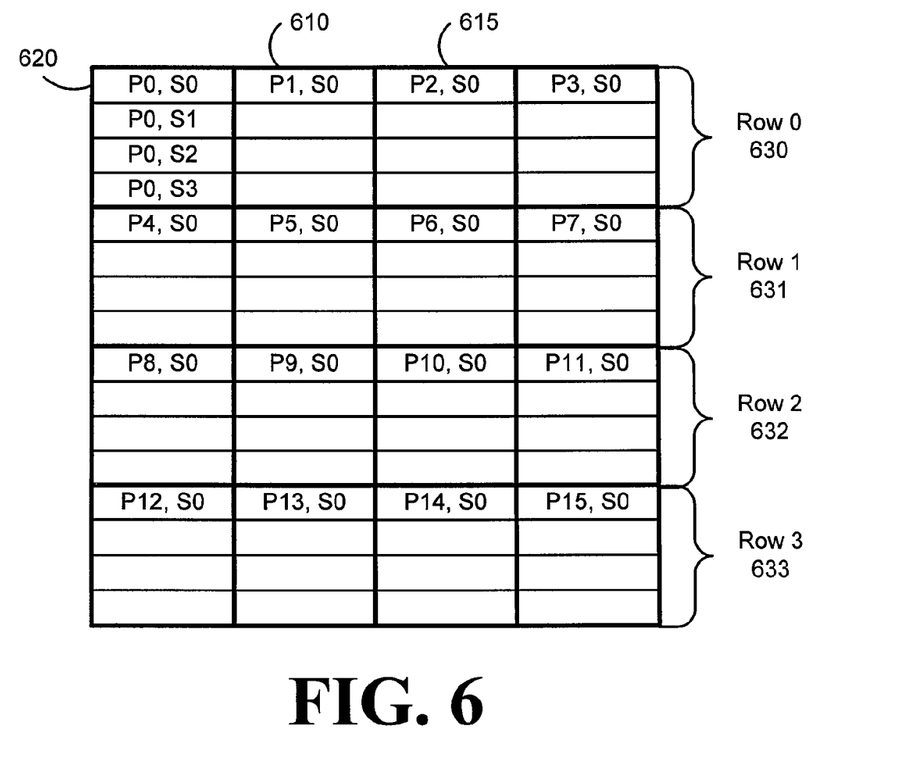
FIG. 6 is a block diagram illustrating an exemplary tile in a multiple-sample-anti-aliasing scheme with a ×4 multisample rate.

Reference is now made to FIG. 6, which is a block diagram illustrating an exemplary tile in a multiple-sample-anti-aliasing scheme. Beginning with the 4 pixel by 4 pixel tile of FIG. 5, the tile 610 includes a four-by-four pixel array where one or more of the pixels 615 includes multiple attribute samples 620. In this embodiment, each pixel 615 is shown as having four samples 620, S0-S3, which indicates a sampling rate of four. One of ordinary skill in the art will understand that the sampling rate of four is presented merely by way of example and not intended to limit the scope or spirit of the disclosure. Accordingly, the sampling rate can be two, eight, or sixteen, among others. The tile 610 includes rows 0-3, 630-633, where each row contains four pixels 615 and thus 16 attribute samples 620. Since each of the sixteen pixels 615 has four corresponding attribute samples 620, the tile 610 includes 64 total samples.

Figure 7:
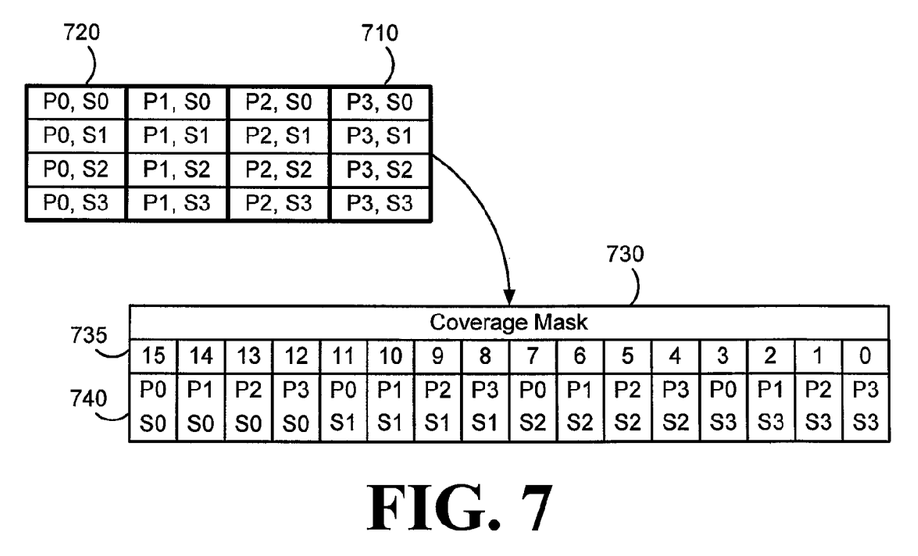
FIG. 7 is a block diagram illustrating an embodiment of a coverage mask as disclosed herein.
Figure 8:
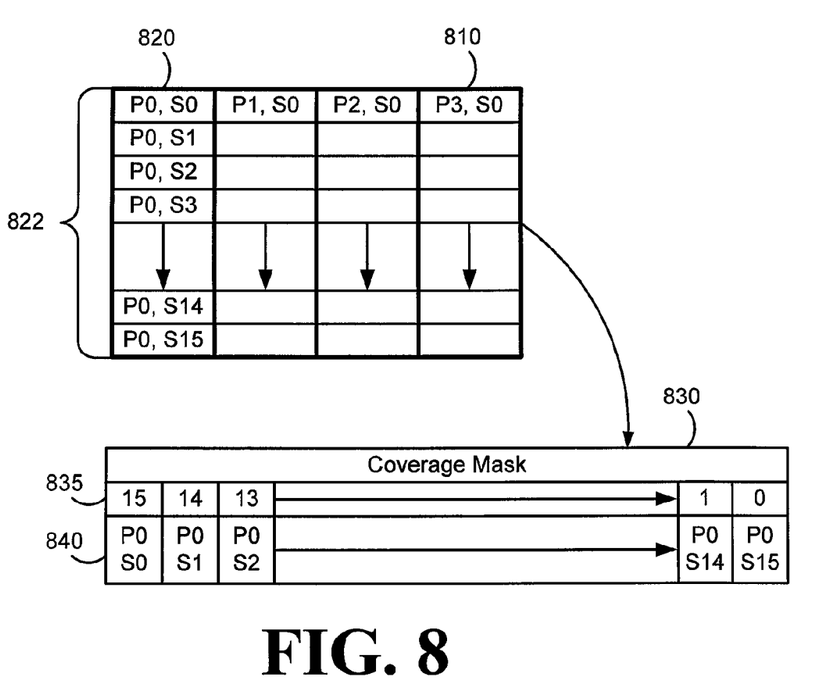
FIG. 8 is a block diagram illustrating an alternative embodiment of a coverage mask as disclosed herein.

Reference is now made to FIG. 7, which is a block diagram illustrating an embodiment of a subpixel coverage mask as disclosed herein. Subpixel coverage may be a part of tile descriptor data, as well. In contrast with the pixel mask as discussed above in reference to FIG. 5, which has the same number of bits as there are pixels in the tile, the coverage mask may be expressed in terms of one or more fixed bit length masks. Continuing with the four-by-four tile example illustrated in FIGS. 5 and 6 and a sampling rate of four, a coverage mask 730 having 16 bit locations 735 can accommodate the subpixel coverage mask bits 740 corresponding to the data in row zero 710 (e.g., a tile row mask bit). Thus, with a sampling rate of four and a capacity of 16 bits, the coverage mask 730 corresponds to the attribute subsamples 720 in four pixels. As shown in FIG. 8, which is a block diagram illustrating an alternative embodiment of a coverage mask, the number of pixels within a coverage mask is determined by the sampling rate in the multiple-sample-anti-aliasing scheme. For example, a four-by-four tile of pixels in a 16-sample scheme may utilize a subsample coverage mask 830 for one or more pixels in the tile.

As illustrated in FIG. 8, the coverage mask 830 can include 16 bit locations 835 and can accommodate the subpixel coverage mask bits 840 corresponding to the data 822 in row 810. Thus, with a sampling rate of four and a capacity of 16 bits, the coverage mask 830 corresponds to the attribute subsamples 820 in four pixels.

Figure 9:
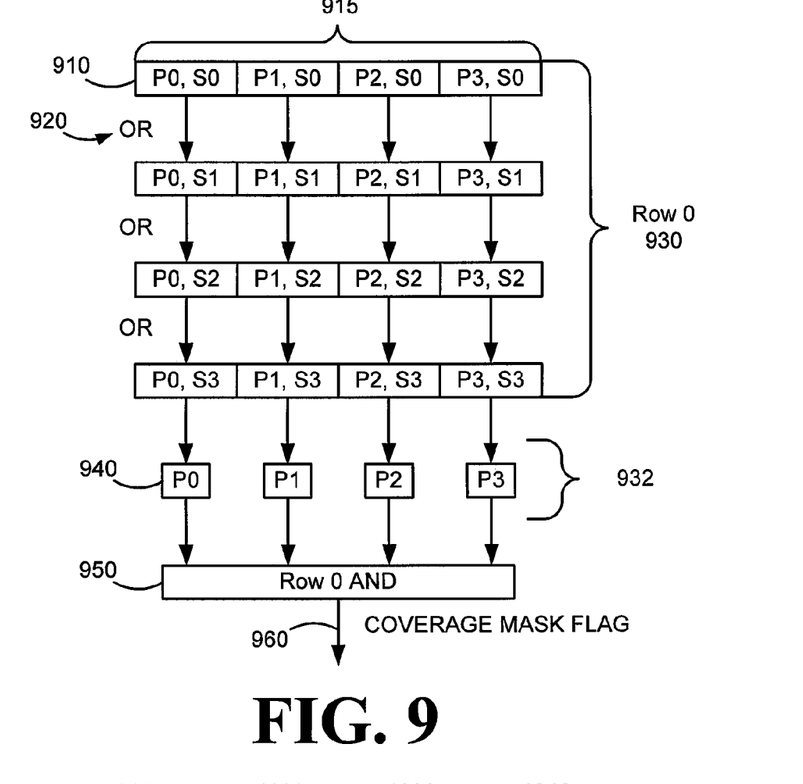
FIG. 9 is a block diagram illustrating an exemplary embodiment of the partial generation of a coverage mask flag and a pixel mask as disclosed herein.

Reference is now made to FIG. 9, which is a block diagram illustrating an exemplary embodiment of a partial generation of a coverage mask flag and a pixel mask as disclosed herein. By way of example, FIG. 9 utilizes the row zero 930 of a four-by-four tile in a multiple-sample-anti-aliasing scheme having a sampling rate of four, as discussed in reference to FIGS. 5, 6, and 7. The attribute sample mask bits 910 are divided into groups of four mask bits 915. A logical OR function 920 is applied between the four groups of mask bits 915 to generate a single OR result bit 940. The OR result bit, in this case, also corresponds to a mask bit for each pixel. The OR result bits 940 are collectively utilized to generate a pixel mask 932, corresponding to the pixels in row zero of the tile. A logical AND function is applied to the group of single or resulting bits 940. The logical OR functions are performed on each of the four rows in the tile. Similarly the logical AND functions are performed on the OR result bits for each row. The result of the logical AND function 950 is a coverage mask flag 960. Thus, in the case of a four-by-four tile, each of the four rows will be evaluated using the same process.

Figure 10:
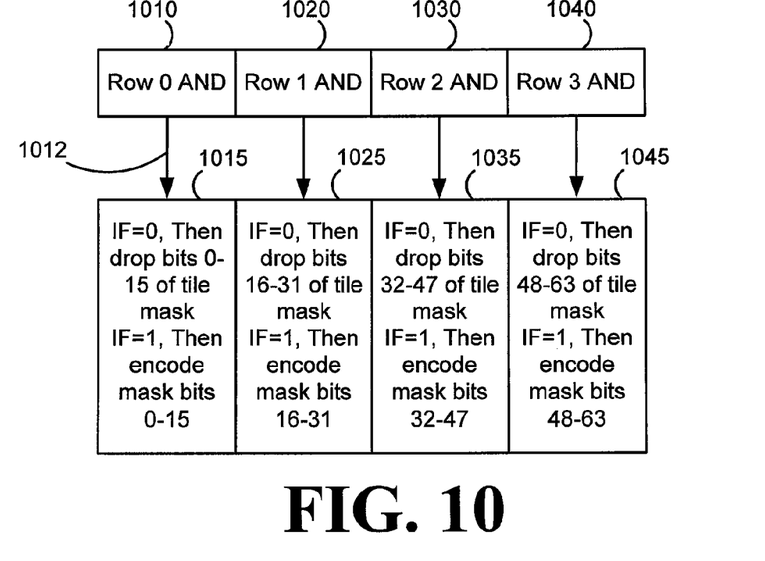
FIG. 10 is a block diagram illustrating an exemplary embodiment of a scheme for encoding coverage mask data.

Reference is now made to FIG. 10, which is a block diagram illustrating an exemplary embodiment of a scheme for encoding coverage masks utilizing the configuration discussed in reference to FIG. 9 as applied to rows 0-3. Block 1010 depicts the row 0 AND function which generates the coverage mask flag 1012 corresponding to the coverage mask for row 0. The coverage mask flag can be stored in memory for subsequent processes or may exist in one or more logic steps within a process. As shown in the evaluation block of 1015, if the coverage mask flag 1012 corresponding to row 0 equals 0, then bits 0-15 of the tile mask have little or no coverage and may be dropped. Alternatively, if the coverage mask flag 1012 equals 1, then tile mask bits 0-15 may be encoded and transmitted to the tile FIFO buffer. Similarly, rows 1-3 are evaluated to determine which portions of the tile mask are dropped and which portions of the tile coverage mask are encoded and transmitted to the tile FIFO buffer as part of tile descriptor data. For example, if the coverage mask flags corresponding to row's 0, 1, and 2 equal zero, then these coverage masks will not be encoded into the tile FIFO buffer.

Figure 11:
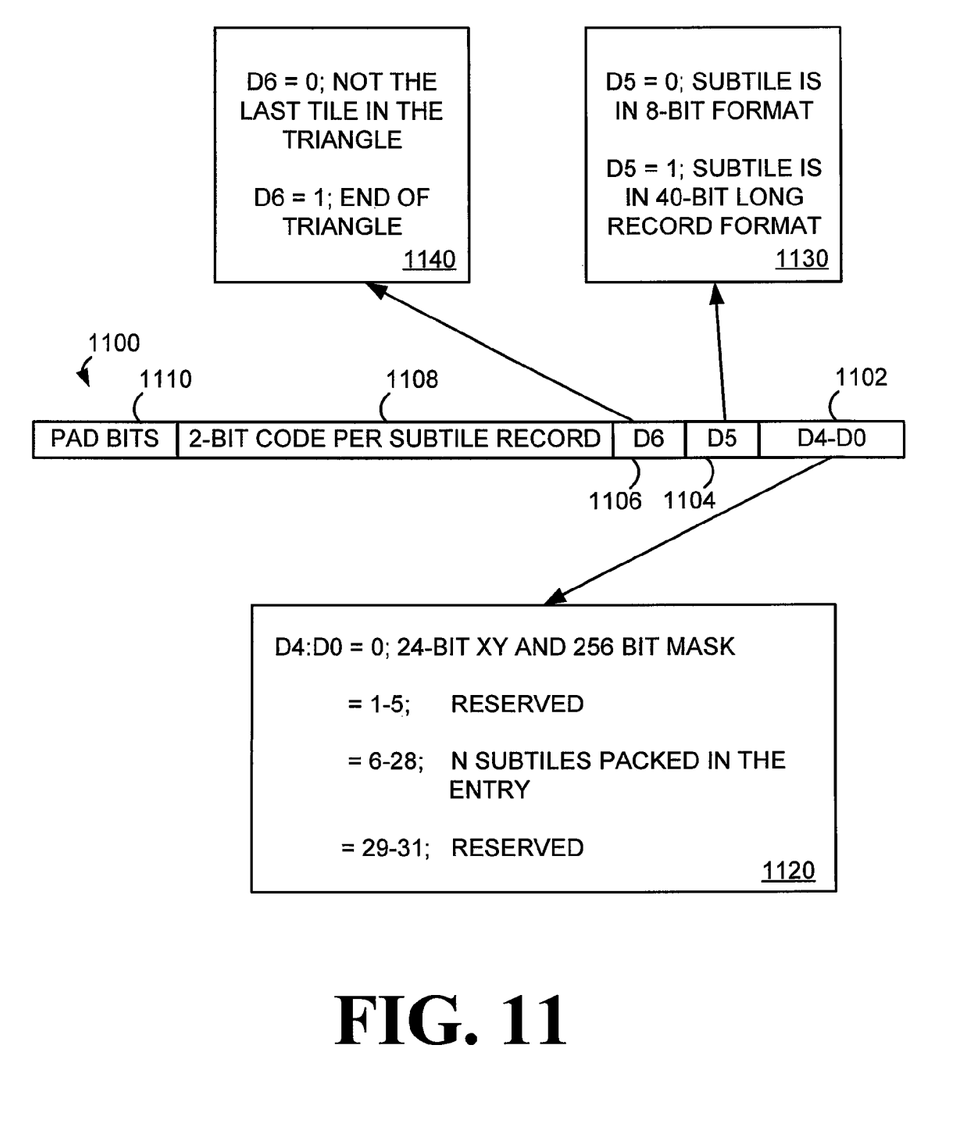
FIG. 11 is a block diagram illustrating an exemplary embodiment of a header for a tile data compression scheme as disclosed herein.

Reference is now made to FIG. 11, which is a block diagram illustrating an exemplary embodiment of a header for a tile descriptor data compression scheme as disclosed herein. The exemplary header 1100 precedes the tile data in the tile FIFO buffer and defines the format of the subsequent tile data. For example, if the value at bits D0-D4 (1102) equals 0 the evaluation block 1120 indicates that the tile data will be stored in the form of a 24-bit X, Y value and a 256-bit mask. If the 5-bit value at D4-D0 (1102) is 1-5 or 29-31 then the function is undefined and reserved for future use. Where the value in D4 through D0 (1102) ranges from 6 and 28 inclusive, the evaluation block 1120 indicates that N-subtiles are packed in the entry. Similarly, the bit at D5 (1104) signals the format of the subtile. For example, in evaluation block 1130, if D5 equals zero the subtile is in 8-bit format of subtile bits and if D5 tile equals 1 the subtile is in a 40-bit long record format. Bit D6 (1106) signals whether or not the current tile represents the end of a triangle. In evaluation block 1140 for example, if D6 equals zero then the present tile is not the last tile in the triangle. Whereas, if D6 equals 1 the present tile is at the end of the triangle. Additionally, a field is included to support a 2-bit code for each following packed subtile record 1108. This field is of variable length and is determined by the number of followed packed subtiles. Finally, the header 1100 includes pad bits 1110, to pad the header out to an 8-bit boundary such that all subtile records start on a multiple of 8-bits.

Figure 12A:
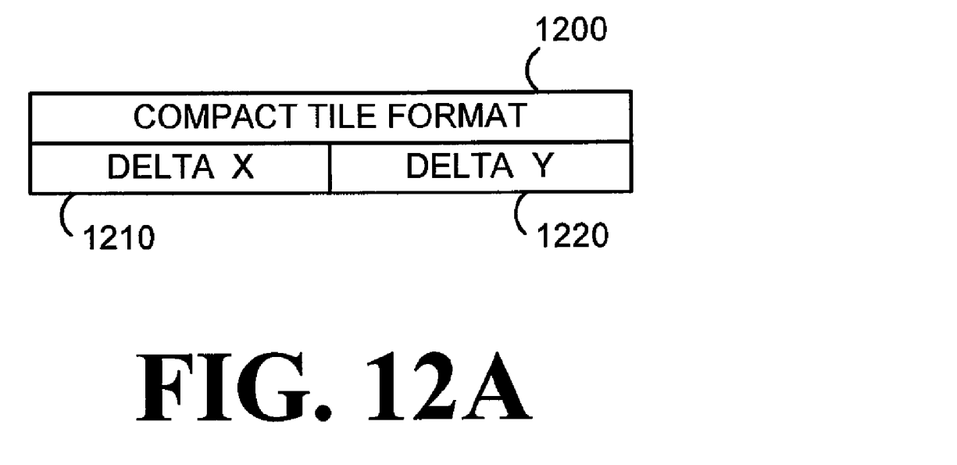
FIGS. 12A and 12B are block diagrams illustrating exemplary embodiments of a compact tile descriptor format and long record tile format descriptor.
Figure 12B:
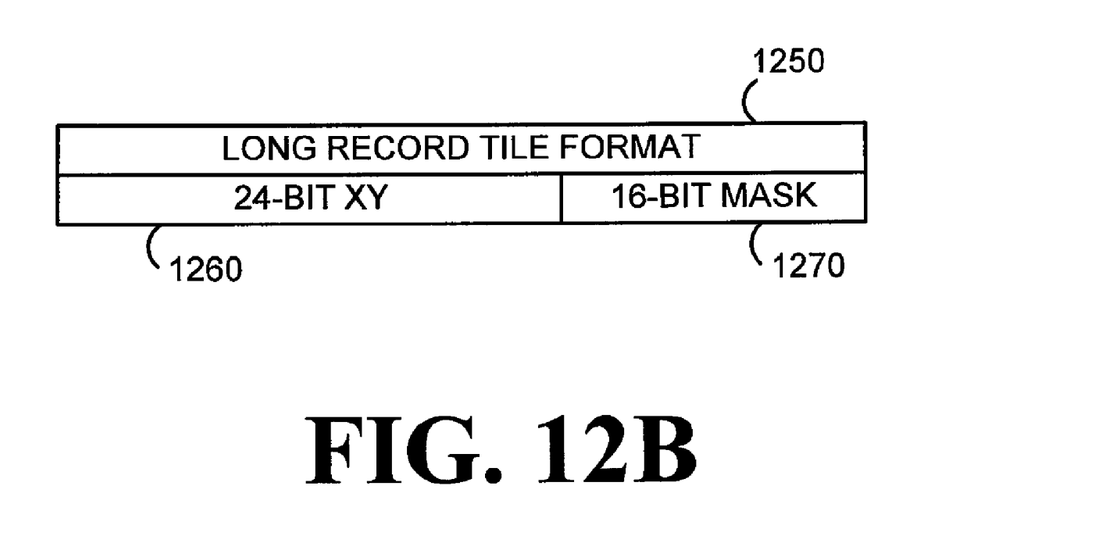

Brief reference is made to FIGS. 12A and 12B, which are block diagrams illustrating exemplary embodiments of the compact tile descriptor record format and a long record tile format as disclosed here. The compact tile descriptor record format 1200 is for example an 8-bit tile record and includes a delta X value 1210 and a delta Y value 1220. The compact tile descriptor format is utilized when all mask bits of the input tile equal one, such that the tile is fully covered. In this case, no pixel or coverage masks are encoded. The long record tile descriptor format 1250 of FIG. 12B includes a 24-bit field for X, Y values 1260 and a field for a 16-bit mask 1270. The long record tile descriptor format is utilized when the tile mask is not all "ones." The lengths and field descriptions of the compact tile format and the long record tile descriptor format are presented merely by way of example and are not intended to limit the spirit or scope of the disclosure in any way. For example, one of ordinary skill in the art will appreciate that the compact tile format may be configured to include lengths of more or less than 8-bits, and similarly, the long record tile format can be configured to include more or less than 40 bits.

Figure 13:
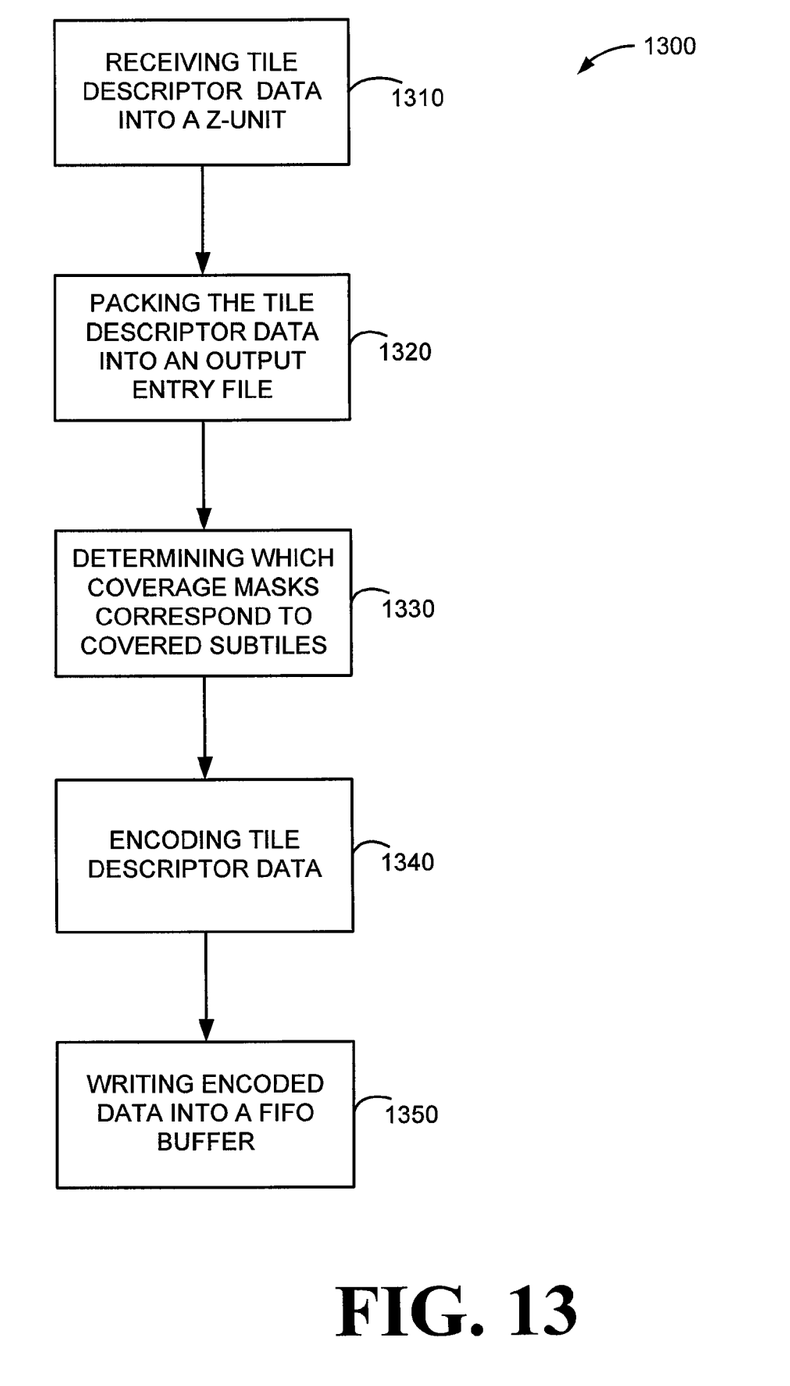
FIG. 13 is a block diagram illustrating an exemplary embodiment of a method of compressing multiple-sample-anti-aliasing tile data in a graphics pipeline as disclosed herein.

Reference is now made to FIG. 13, which is a block diagram illustrating an exemplary embodiment of a method of compressing multiple-sample-anti-aliasing tile data in a graphics pipeline as disclosed herein. The method 1300 begins with receiving tile data into a Z-unit in block 1310. The Z-test unit in this circumstance is a pixel Z-test unit, also referred to as ZL2, which performs the pixel Z-test. In block 1320, the tile descriptor data is packed into an output entry file. The output entry file includes a header and in extremes can include precision coordinate data and a coverage mask for every pixel in the tile. In block 1330, coverage masks that correspond to covered subtiles are determined in order to select which of the coverage masks will be encoded and which of the coverage masks will be dropped before writing to the tile FIFO buffer. The tile descriptor data is encoded in block 1340 and the encoded data is written into a FIFO buffer in block 1350.

Figure 14:
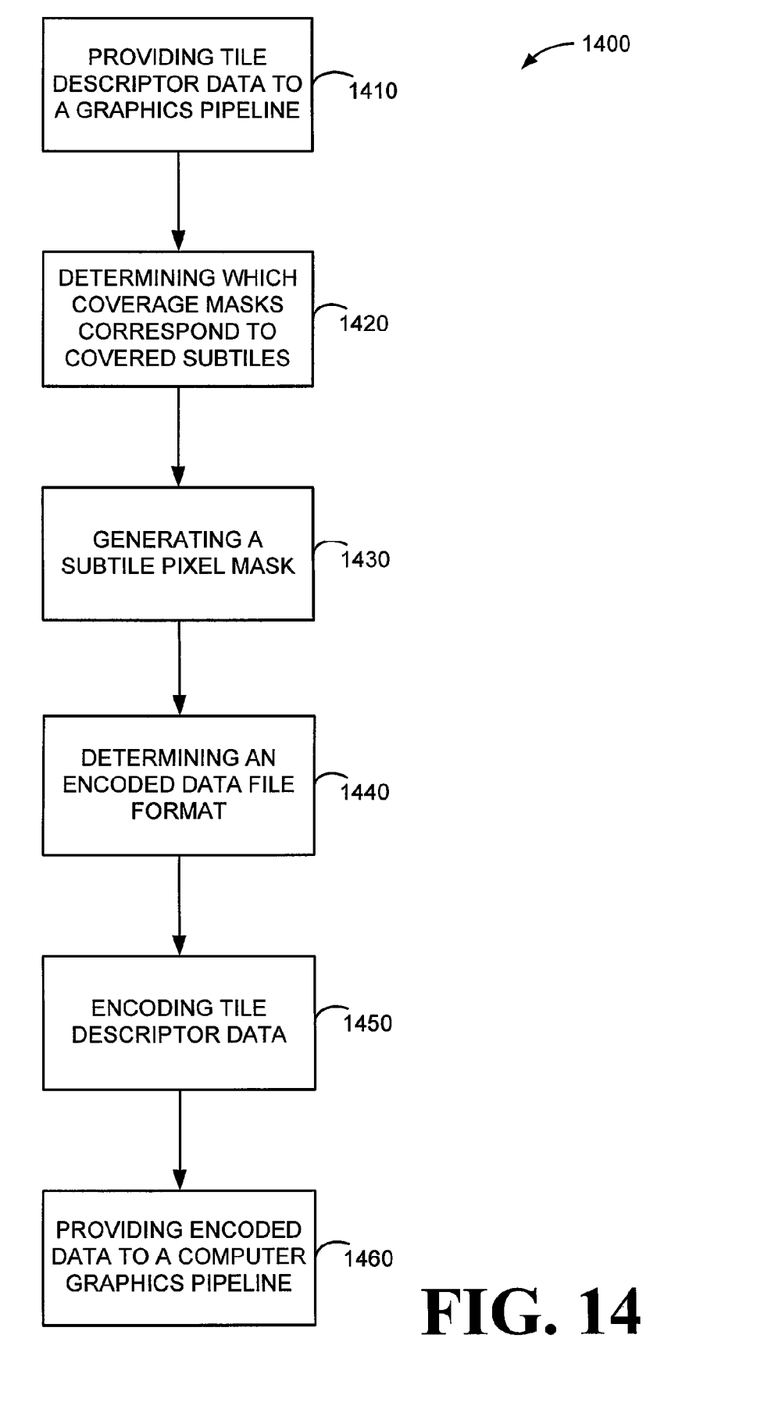
FIG. 14 is a block diagram illustrating an alternative embodiment of a method of compressing multiple-sample-anti-aliasing tile data in a graphics pipeline as disclosed herein.

Reference is now made to FIG. 14, which is a block diagram illustrating an alternative embodiment of a method of compressing multiple-sample-anti-aliasing tile data in a graphics pipeline as disclosed herein. The method 1400 in block 1410 begins with providing descriptor data to a graphics pipeline. The descriptor data in this case includes multi-sample anti-aliasing coverage data, which provides multiple descriptor samples for each pixel in the tile. The number of samples per pixel is determined by a sampling rate and may include two, four, eight, or sixteen among others. In block 1420 the coverage masks that correspond to covered subtiles are determined in order to determine which of the coverage masks are to be encoded for the tile FIFO buffer. The coverage masks can also be utilized to generate a subtile pixel coverage mask in block 1430, which provides a mask bit for each pixel in the tile. Utilizing the values in the subtile pixel mask and the coverage masks, a data file format is determined for the encoded data in block 1440. For example, if all samples in the tile are covered then the encoded data file can be expressed in a compact tile format. Alternatively, where the tile is not fully covered, the encoded tile descriptor data can be expressed in a long record tile format. In block 1450, the tile descriptor data is encoded and the encoded data is provided to a computer graphics pipeline in block 1460.

Embodiments of the present disclosure can be implemented in hardware, software, firmware, or a combination thereof. Some embodiments can be implemented in software or firmware that is stored in a memory and that is executed by a suitable instruction execution system. If implemented is in hardware, an alternative embodiment can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Process descriptions or blocks in flow charts should be understood as representing modules, segments, or portions of code which include one or more executable instructions for implementing specific logical functions or steps in the process, and alternate implementations are included within the scope of an embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

At least the following is claimed:

1. A graphics processing system for compressing multiple-sample-anti-aliasing (MSAA) tile descriptor data in a computer graphics pipeline, comprising:
   tile descriptor data, corresponding to a tile, comprising a plurality of samples corresponding to a plurality of pixels;
   a plurality of graphics data processing units configured to receive and send the plurality of samples to and from a tile FIFO buffer to access the tile descriptor data containing a plurality of coverage masks, wherein each of the plurality of coverage masks corresponds to one of the plurality of pixels in the tile and the coverage mask corresponds to covered subtiles; and
   compression logic configured to encode the tile descriptor data.

2. The system of claim 1, wherein each of the plurality of coverage masks comprises a plurality of bits corresponding to the plurality of samples corresponding to at least one of the plurality of pixels.

3. The system of claim 1, wherein if the tile is fully covered then the encoded tile descriptor data comprises a compact tile format.

4. The system of claim 1, wherein if the tile is not fully covered, then the encoded tile descriptor data comprises a long record tile format.

5. The system of claim 4, wherein the long record tile descriptor format comprises a tile mask and full XY coordinates.

6. The system of claim 5, wherein the tile mask comprises a logical OR function applied to a plurality of subsets of the plurality of pixel coverage masks.

7. The system of claim 6, further comprising a plurality of coverage mask flags and the plurality of coverage mask flags comprise a logical AND function applied to the results of the plurality of logical OR functions applied to the plurality of subsets of at least one of the plurality of coverage masks.

8. The system of claim 7, wherein if one of the plurality of coverage mask flags equals zero then the corresponding one of the plurality of coverage masks is omitted from the encoded tile descriptor data.

9. The system of claim 1, wherein the FIFO buffer comprises a plurality of read pointers corresponding to the plurality of graphics data processing units.

10. A method for compressing tile data in a multiple-sample anti-aliasing computer graphics pipeline, comprising:
    receiving tile descriptor data, corresponding to a tile, into a Z-buffer;
    packing the tile descriptor data into an output file entry for subsequent processing by a plurality of pipeline processing units;
    determining which coverage masks correspond to covered subtiles;
    encoding the tile descriptor data; and
    writing encoded tile descriptor data into a FIFO buffer.

11. The method of claim 10, wherein the encoding comprises generating a compact tile descriptor format if the tile is fully covered.

12. The method of claim 10, wherein the encoding comprises generating a long record tile descriptor format if the tile is partially covered.

13. The method of claim 12, wherein generating the long record tile descriptor format further comprises preceding a subtile pixel mask with a plurality of coordinates, wherein the plurality of coordinates comprise at least one X value and at least one Y value.

14. The method of claim 10, wherein the determining comprises calculating a plurality of tile row mask bits, corresponding to one of a plurality of tile rows.

15. The method of claim 14, wherein calculating the plurality of tile row mask bits comprises applying a logical OR function between a plurality of subsets of the plurality of coverage masks.

16. The method of claim 15, further comprising applying a logical AND function to the plurality of tile row mask bits to determine whether any of the plurality of coverage masks corresponding to one of the plurality of tile rows are required.

17. The method of claim 10, further comprising creating a subtile pixel coverage mask.

18. The method of claim 17, wherein the creating comprises grouping the plurality of bits corresponding to the plurality of rows.

19. The method of claim 10, wherein the encoding comprises:
    selecting the subtile pixel coverage mask; and
    selecting the ones of the plurality of coverage masks that are required.

20. The method of claim 10, wherein the writing comprises storing the encoded tile descriptor data in a single RAM, wherein the single RAM comprises a plurality of read pointers corresponding to the plurality of pipeline processing units.

* * * * *